(12) United States Patent
Wu et al.

(10) Patent No.: US 8,722,004 B2
(45) Date of Patent: May 13, 2014

(54) METHOD FOR THE PREPARATION OF A LITHIUM PHOSPHATE COMPOUND WITH AN OLIVINE CRYSTAL STRUCTURE

(75) Inventors: Mark Y. Wu, Wujie Township, Yilan County (TW); Cheng-Yu Hsieh, Wujie Township, Yilan County (TW); Chih-Hao Chiu, Wujie Township, Yilan County (TW)

(73) Assignee: Phosage, Inc., Yilan County (TW)

( * ) Notice: Subject to any disclaimer, the term of this patent is extended or adjusted under 35 U.S.C. 154(b) by 710 days.

(21) Appl. No.: 12/478,387

(22) Filed: Jun. 4, 2009

(65) Prior Publication Data

US 2010/0202951 A1 Aug. 12, 2010

(30) Foreign Application Priority Data

Feb. 12, 2009 (TW) ................. 98104490 A

(51) Int. Cl.
*C01B 25/26* (2006.01)
(52) U.S. Cl.
USPC ............ 423/305; 423/306; 423/299; 423/302
(58) Field of Classification Search
USPC .................................................. 423/306, 305
See application file for complete search history.

(56) References Cited

U.S. PATENT DOCUMENTS

| | | | |
|---|---|---|---|
| 5,910,382 A | | 6/1999 | Goodenough et al. |
| 6,528,033 B1 | | 3/2003 | Barker et al. |
| 6,716,372 B2 * | | 4/2004 | Barker et al. ............. 252/518.1 |
| 6,730,281 B2 * | | 5/2004 | Barker et al. ................. 423/306 |
| 2006/0147365 A1 * | | 7/2006 | Okada et al. .................. 423/306 |
| 2006/0257307 A1 * | | 11/2006 | Yang .............................. 423/306 |
| 2008/0008938 A1 * | | 1/2008 | Wu et al. ....................... 429/221 |
| 2010/0059706 A1 * | | 3/2010 | Dai et al. .................... 252/182.1 |

FOREIGN PATENT DOCUMENTS

| | | |
|---|---|---|
| TW | I254031 | 5/2006 |
| TW | I292635 | 1/2008 |

OTHER PUBLICATIONS

Shiraishi et al., "Formation of impurities on phospho-olivine LiFePO4 during hydrothermal synthesis," Journal of Power Sources, 2005, pp. 555-558, vol. 146.

* cited by examiner

*Primary Examiner* — Melvin C Mayes
*Assistant Examiner* — Colette Nguyen
(74) *Attorney, Agent, or Firm* — Muncy, Geissler, Olds & Lowe, P.C.

(57) ABSTRACT

The present invention relates to a method for the preparation of a lithium phosphate compound with an olivine crystal structure, which has a chemical formula of $Li_xM_yM'_{1-y}PO_4$, wherein $0.1 \leq x \leq 1$, $0 \leq y \leq 1$. The nano-scale lithium phosphate ceramic powder was synthesized by using a self-propagating combustion with reactants of soluble salts and the proper oxidizing agents, followed by heat treatment of powder to obtain nano-scale lithium phosphate compound with an olivine crystal structure in a complete crystal phase. The method of the present invention uses low cost materials and simple processes. The uniform crystal product materials are beneficial to the industrial application.

24 Claims, 2 Drawing Sheets

METHOD FOR THE PREPARATION OF A LITHIUM PHOSPHATE COMPOUND WITH AN OLIVINE CRYSTAL STRUCTURE

BACKGROUND OF THE INVENTION

1. Field of the Invention

The present invention relates to a method for the preparation of a lithium phosphate compound with an olivine crystal structure, which has a chemical formula of $Li_xM_yM'_{1-y}PO_4$ wherein $0.1 \leq x \leq 1$, $0 \leq y \leq 1$, in particular to a method for the preparation of a nano-scale lithium phosphate ceramic powder by a self-propagating solution combustion.

2. The Prior Arts

The secondary lithium-ion battery has several advantages such as high energy density and superior life cycle, which has rapidly substituted the nickel-cadmium battery and nickel metal hydride battery after developed. The market of lithium-ion battery has increased consistently after the commercialized product was launched by Sony in 1991. The total production volume in more than 10 years was more than the summary of the nickel-cadmium battery and nickel metal hydride battery. The application area of lithium-ion battery has been expanded with the improvement or presence of new materials and battery technology. The 3C (Computer, Communication and Consumer) product has the properties of being light, thin, short and small, which makes the lithium secondary battery the best choice.

Lithium iron phosphate ($LiFePO_4$) battery (LFP) is the new generation of lithium secondary battery, which has been attracting enormous research interest in vehicle, electric tools, and aviation industry. The commercialized product was launched in 2004, way behind the launches of nickel metal hydride battery in 1990 and lithium cobalt (the battery used in 3C products at present) in 1992. Lithium iron phosphate offers no safety problems of overheating or explosion, 4 to 5 times of cycle life and 8 to 10 fold of high power discharge (high power density, which can generate larger current suddenly) in comparison to general lithium-ion battery. In addition, the total weight at the same energy density of a lithium iron phosphate battery is 30-50% lower than that of other lithium-ion battery. Major corporations including Boeing, General Motors, Ford, Segway, and Black & Decker all are highly interested in development of Lithium iron phosphate battery.

Lithium iron phosphate batteries also have their drawbacks. The energy density of lithium iron phosphate batteries is 25-40% lower than that of $LiCoO_2$, which is not applicable in portable 3C products with high energy density. In addition, the high threshold in powder sintering technology and difficulties in mass production of lithium iron phosphate battery have made it expensive to be used broadly in related industry.

The ceramic crystal of LFP has an olivine structure, a slightly twisted hexagonal close-packed structure which commonly exists among natural minerals. The artificial synthesized powder is used widely since LFP has very low purity in natural mineral olivines. The crystal structures of $MO_6$ octahedra and $PO_4$ tetrahedra limit the change in crystal lattice volume, which affects the insertion and extraction of lithium ions, further lowers the diffusion rate of lithium ions and causes the decrease of lithium ion electronic conductivity and diffusion coefficient. Therefore, artificial synthesis through decreasing the particle size or doping has become a key point for the recent research and development as well as the objective for the present invention.

The main synthesis methods for LFP include solid-state reaction, carbonthermal reduction method, hydrothermal synthesis and so on. These methods are briefly described below.

1. Solid State Reaction

In general, lithium salts, ferrous compounds and phosphate compounds are mixed and heated to react and yield lithium iron phosphate after diffusion. As mentioned in U.S. Pat. No. 5,910,382, $Li_2(CO_3)$, $Fe(CH_3COO)_2$, and $NH_4H_2PO_4$ were mixed according to the stoichiometric ratio and put into a high temperature oven, heated at 650-800° C. for 24 hours at the presence of inert gas. The LFP products were grinded into proper particle sizes. However, the method needs an excessively high temperature in long time, which is energy consuming and causes grouping of products. The distribution of product sizes is uneven after grinding, and the instrument can be contaminated easily. Therefore the method is of less economical value, and the poor quality of product is not suitable for mass industrial application.

The Taiwan Patent No. I292635 discloses an alternative method using a metallic crucible as the container of powder and carbonate salt as a reactant to generate a protective atmosphere in order to save the cost of inert gas. There are still drawbacks of energy consuming, uneven particles and contamination due to high temperature in long time.

2. Carbonthermal Reduction

The abovementioned solid state reaction using compounds with $Fe^{2+}$ as reactant, which is more expensive than compounds with $Fe^{3+}$. In order to solve the above problems, the precursors of carbon are generally added to reactants of lithium compound, $Fe^{3+}$ compound and phosphate during the preparation to reduce $Fe^{3+}$ to $Fe^{2+}$ as mentioned in U.S. Pat. Nos. 6,528,033, 6,716,372, and 6,730,281. The amount of carbon is difficult to control in these methods though the cost of reactants could be decreased. Too little carbon will affect the characteristics in materials since $Fe^{3+}$ could not be reduced, while too much carbon could result in reducing the iron compound to iron metal, followed by lowering the electronic capacity.

Another method in Taiwan Patent No. I254031 discloses heating a carbon source to generate fine carbon particles, then carrying these particles to reacting area by inert gas to reduce $Fe^{3+}$ to produce $Fe^{2+}$ to overcome the drawback mentioned above. However, the processes are more complicated, and are still time- and energy-consuming since the carbon source needs to be heated at 300° C. to decompose first, then reacted at 700° C.

3. Hydrothermal Synthesis

Hydrothermal methods have been applied to the synthesis of lithium iron phosphates by reacting soluble lithium compound, ferrous compound and phosphate salt under high temperature and high pressure in aqueous solution. Nano-scale lithium iron phosphate particles at even size of 0.5 μm were synthesized by reacting lithium hydroxide (LiOH), ferrous sulfate ($FeSO_4$) and phosphate at 150-200° C. in hydrothermal condition, followed by treatment at 400° C. with nitrogen gas for several hours (Keisuke Shiraishi et al., Journal of Power Sources 146 (2005) 555-558). However, this study was limited to the academic field because of harsh synthetic condition, expensive equipments, and drawbacks of high cost as well as difficulties with mass production.

SUMMARY OF THE INVENTION

The objective of the present invention is to provide a method for the preparation of a nano-scale lithium phosphate compound with an olivine crystal structure, and the method can be called as a self-propagating solution combustion method. The lithium phosphate compound has a chemical formula of $Li_xM_yPO_4$, wherein $0.1 \leq x \leq 1$, $0 \leq y \leq 1$. The nano-scale lithium phosphate ceramic powder can be synthesized with low cost materials and simple processes. The method comprises the steps of: (a) providing an aqueous solution containing at least one M metal ion, a lithium ion, a phosphate ion and a nitric acid; (b) adding a soluble reductant and a carbon source to the aqueous solution prepared in Step (a); (c) dehydrating the aqueous solution followed by a self-propagating combustion; and (d) heating a combusted product obtained from the self-propagating combustion to promote crystallization of the combusted product, in order to obtain a final product with a complete crystal phase.

According to the abovementioned concept, the final product, a lithium phosphate compound, could have a chemical formula of $Li_xM_yM'_{1-y}PO_4$, wherein $0.1 \leq x \leq 1$, $0 \leq y \leq 1$, if the aqueous solution in step (a) further consists another metal ion M'.

According to the abovementioned step, M metal ion is selected from the group consisting of iron (Fe), titanium (Ti), vanadium (V), manganese (Mn), chromium (Cr), cobalt (Co), nickel (Ni), copper (Cu) and zinc (Zn); and the source of the M metal ion is selected from the group consisting of a nitrate compound, a sulfate compound, an oxalate compound, a phosphate compound, an acetate compound, and a carbonate compound; or by dissolving a M metal or a M metal compound in strong acid solution selected from the group consisting of hydrochloric acid (HCl), nitric acid ($HNO_3$), phosphoric acid ($H_3PO_4$), sulfuric acid ($H_2SO_4$), hydrofluoric acid (HF) and combinations thereof.

According to the abovementioned concept, if iron is the M metal ion, low cost ferrous sulfate ($FeSO_4$) can be reacted with barium nitrate ($Ba(NO_3)_2$) to yield clear ferrous nitrate ($Fe(NO_3)_2$) as a reactant after precipitate of barium sulfate ($BaSO_4$) is filtered out.

According to the abovementioned concept, a source of the lithium ion is a soluble compound selected from the group consisting of lithium nitrate ($LiNO_3$), lithium oxalate ($Li_2C_2O_4$), lithium phosphate ($Li_3PO_4$), lithium acetate ($CH_3COOLi$), lithium carbonate ($Li_2CO_3$), lithium chloride (LiCl), lithium bromide (LiBr), lithium hydroxide (LiOH), and lithium dihydrogen phosphate ($LiH_2PO_4$), or dissolving a lithium metal or a lithium compound in strong acid solution selected from the group consisting of hydrochloric acid (HCl), nitric acid ($HNO_3$), phosphoric acid ($H_3PO_4$), sulfuric acid ($H_2SO_4$), hydrofluoric acid (HF) and combinations thereof.

According to the abovementioned concept, the phosphate ion is from phosphoric acid or aqueous phosphoric compound such as ammonium dihydrogen phosphate ($NH_4H_2PO_4$), ammonium hydrogen phosphate (($NH_4)_2HPO_4$), triammonium phosphate (($NH_4)_3PO_4$), phosphorous pentoxide ($P_2O_5$), lithium phosphate ($Li_3PO_4$), lithium dihydrogen phosphate ($LiH_2PO_4$), lithium hydrogen phosphate ($Li_2HPO_4$) and combinations thereof.

According to the abovementioned concept, the nitric acid can be used as an oxidant for the self-propagation combustion in Step (c), wherein the amount of the nitric acid added is according to the weight of the final product, with a preferred ratio of 20-300%, more preferably of 50-150%, and most preferably of 80-120%.

According to the abovementioned concept, a carbon-containing protective layer can be formed on surface of the combusted product to prevent the oxidation of ferrous ion to ferric ion in step (d) if ferrous ion is a starting reactant. The process can be performed by adding a soluble organic agent into the reacting solution to leave residual carbon on surface of the combusted product powder during combustion. The organic agent is selected from the group consisting of glucose ($C_6H_{12}O_6$), sucrose ($C_{12}H_{22}O_{11}$), starch (($C_6H_{10}O_5)_n$), oligo-sugar (($CH_2O)_n$), poly olig-sugar (($CH_2O)_n$), fructose ($C_6H_{12}O_6$), resin and combinations thereof. The amount added is according to the weight of the final product, with a ratio preferably of 10-200%, more preferably of 50-150%, and most preferably of 80-120%.

According to the abovementioned concept, the ideal reductant with high enthalpies for self-propagation combustion in Step (b) is selected from the group consisting of urea (CO$(NH_2)_2$), citric acid ($C_6H_8O_7$), glycine ($C_2H_5NO_2$), alanine ($C_3H_7NO_2$), carbohydrazide ($CH_6N_4O$), dimthyl dihydrazide ($C_2H_4N_2O_2$), oxalyl dihydrazide ($C_2H_6N_4O_2$) and combinations thereof. The amount added is according to the weight of the final product, with a ratio preferably of 20-250%, more preferably of 50-200%, and most preferably of 80-150%.

According to the abovementioned concept, the processes of the self-propagation combustion in Step (c) start by putting a reactant solution in a heating source. The reactant solution becomes a viscous gel after water evaporated. When the reacting gel is continuously heated to reach the ignition point, combustion reaction starts from local area, generates lots of gas and heat in wave propagation to ignite the rest reactants, which forms chain reaction to burn all the reactants even when the heat source closed. Therefore this method is also called as self-propagating combustion synthesis, which is very fast usually in several minutes for the reaction to complete. The temperature of the heating source is preferably between 100-500° C., more preferably between 200-450° C., and most preferably between 250-350° C.

According to the abovementioned concept, as-synthesized products of combustion in Step (d) do not have good crystallization. Therefore the heat-treatment is carried out to promote the crystallization and remove the residual impurities. An inert gas environment is applied to prevent the oxidation of metal ions with multiple charges. The inert gas is selected from the group consisting of helium (He), argon (Ar), nitrogen ($N_2$), carbon dioxide ($CO_2$) and combinations thereof. A mixture of a reducing gas and the inert gas is applied to reduce the metal ions from high oxidative state to low oxidative state. The reducing gas is selected from the group consisting of hydrogen gas ($H_2$), ammonium gas ($NH_3$), carbon monoxide (CO) and combinations thereof. A ratio of the reducing gas is preferably between 0.1-10 vol %, more preferably between 0.5-5 vol %, and most preferably between 1-3 vol %. The heat-treatment temperature is preferably between 400-900° C., more preferably between 500-800° C., and most preferably between 550-700° C. The heat-treatment time is preferably between 0.5-48 h, more preferably between 4-36 h, and most preferably between 6-24 h.

Another object of the present invention is to improve the shortcoming of electric conducting rate of olivine crystals by adding another metal ion M' into the reacting solution. The final product, lithium phosphate compound with an olivine crystal structure, has a common chemical structure of $Li_xM_yM'_{1-y}PO_4$ wherein $0.1 \leq x \leq 1$, $0 \leq y \leq 1$. M' metal ion is selected from the group consisting of magnesium (Mg), calcium (Ca), aluminum (Al), zinc (Zn), manganese (Mn), copper (Cu), zirconium, nickel (Ni), and rare earth element cerium (Ce) and samarium (Sm). The source of the M' metal ion is selected from the group consisting of a nitrate compound, a sulfate compound, an oxalate compound, a phosphate compound, an acetate compound, and a carbonate compound; or dissolving a M' metal or a M' metal compound in strong acid solution selected from the group consisting of hydrochloric acid (HCl), nitric acid ($HNO_3$), phosphoric acid ($H_3PO_4$), sulfuric acid ($H_2SO_4$), hydrofluoric acid (HF) and combinations thereof.

DETAILED DESCRIPTION OF THE PREFERRED EMBODIMENT

The present invention is further explained in the following embodiment illustration and examples. Those examples below should not, however, be considered to limit the scope of the invention.

Examples 1-3 are embodiments for synthesis method of $Li_xM_yM'_{1-y}PO_4$, wherein x=1, y=1, M is ferrous or ferric ion without addition of M'.

Example 1

Figure 1:
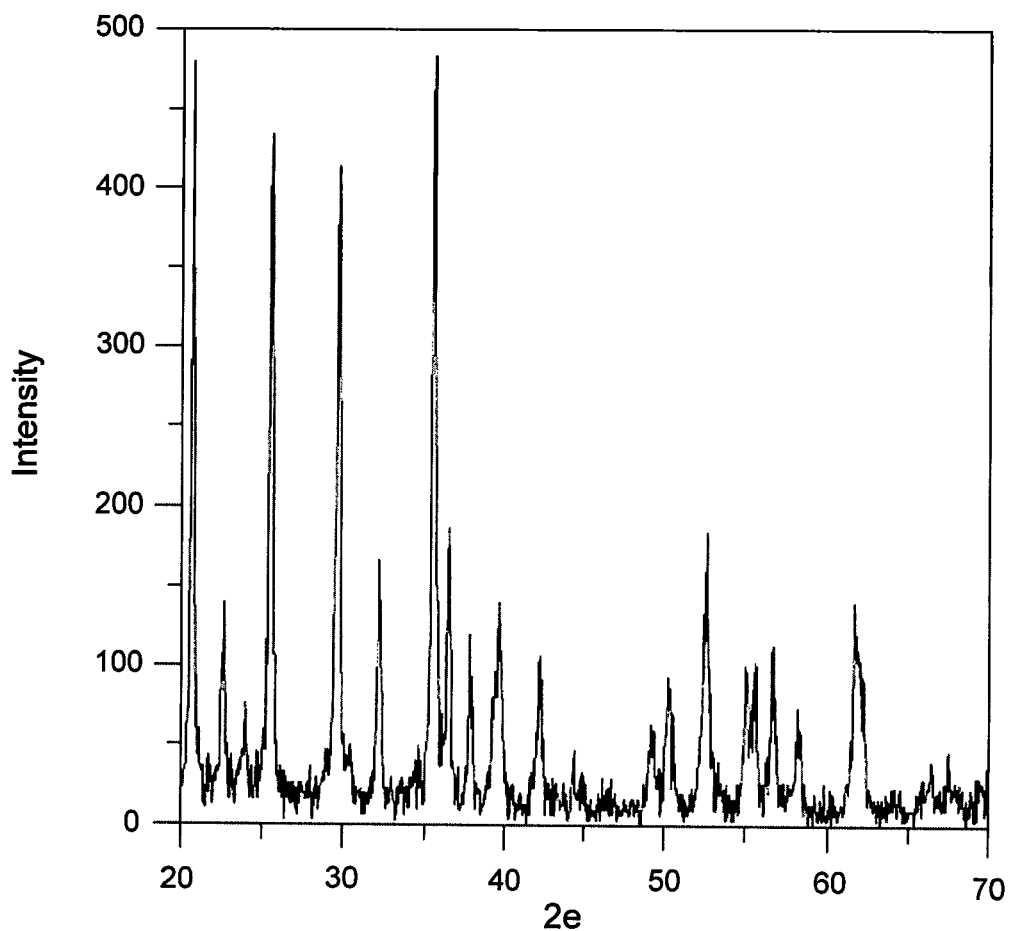
FIG. 1 shows the X-ray powder diffraction (XRD) of an olivine structure product $LiFePO_4$ prepared from Example 1 in the present invention.

12.928 g of ferric nitrate ($Fe(NO_3)_3.9H_2O$) and 2.206 g of lithium nitrate ($LiNO_3$) was added with deionized water with stirring respectively, followed by pooling and addition of 3.689 g of phosphoric acid ($H_3PO_4$) and 5 g of nitric acid ($HNO_3$) after mixed thoroughly. After completely stirred and mixing of 6.16 g of Glycine ($C_6H_8O_7.H_2O$) and 5 g of glucose ($C_6H_{12}O_6$), the solution was put into a high temperature oven and heated to 300° C. for 30 min. Small and loose powder was generated after temperature dropped. The powder was brought back to the furnace and heated to 600° C. for 6 h under a mixed gas, with hydrogen gas at flow rate of 100 ml/min and argon gas at flow rate of 1 l/min. Ceramic powder of $LiFePO_4$ in complete crystal phase could be obtained as temperature dropped, and the X-ray powder diffraction (XRD) is shown in FIG. 1.

Example 2

The basic steps of example 2 were the same as in example 1 except the ferric nitrate was replaced with ferrous nitrate ($Fe(NO_3)_2.9H_2O$) in a weight of 5.760 g. The powder products obtained from the same combustion method was brought back to the oven and heated to 600° C. for 6 h with argon gas at flow rate of 800 ml/min. Ceramic powder of $LiFePO_4$ in complete crystal phase was obtained as temperature dropped, and the X-ray powder diffraction (XRD) is the same as shown in FIG. 1.

Example 3

8.896 g of ferric sulfate ($FeSO_4.7H_2O$) and 8.363 g of barium nitrate ($Ba(NO_3)_2$) was dissolved in deionized water respectively, followed by mixing both solution to yield white precipitate. The clear solution was obtained after suction, and 2.206 g of lithium nitrate ($LiNO_3$), 3.689 g of phosphoric acid ($H_3PO_4$) and 5 g of nitric acid ($HNO_3$) was added into the clear solution respectively with stirring and mixed thoroughly. After addition of 6.16 g of Glycine ($C_6H_8O_7.H_2O$) and 5 g of glucose ($C_6H_{12}O_6$) and complete mixing, the solution was put into a high temperature oven and heated to 300° C. for 30 min. Small and loose powder was generated after temperature dropped. The powder was brought back to the furnace and heated to 600° C. for 6 h with argon gas at flow rate of 800 ml/min. Ceramic powder of $LiFePO_4$ in complete crystal phase was obtained as temperature dropped, and the X-ray powder diffraction (XRD) is the same as shown in FIG. 1.

Example 4

The example is an embodiment of synthesis method of $Li_xM_yM'_{1-y}PO_4$, wherein x=1, y=1, M is manganese (Mn) ion without addition of M'.

Figure 2:
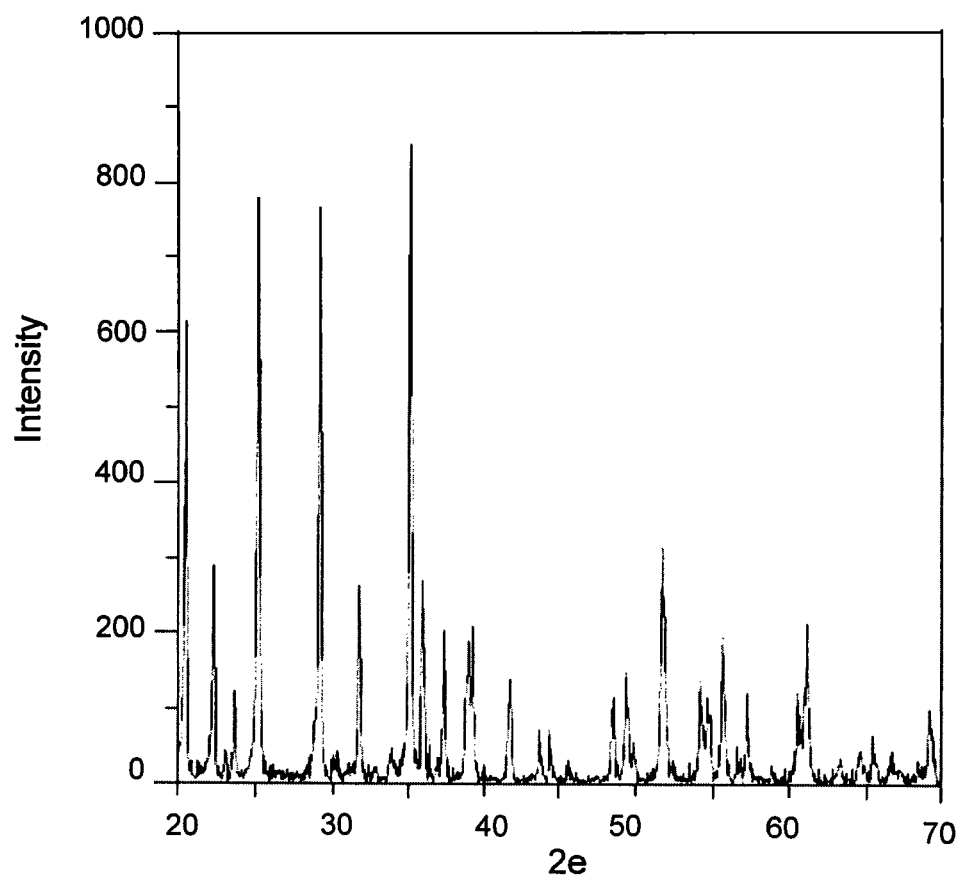
FIG. 2 shows the X-ray powder diffraction (XRD) of an olivine structure product $LiMnPO_4$ prepared from Example 4 in the invention.

8.032 g of manganese nitrate ($Mn(NO_3)_2.4H_2O$) and 2.206 g of lithium nitrate ($LiNO_3$) was dissolved in deionized water respectively, followed by mixing both solution and adding 3.689 g of phosphoric acid ($H_3PO_4$) and 5 g of nitric acid ($HNO_3$). After mixed thoroughly, 6.16 g of Glycine ($C_6H_8O_7.H_2O$) and 5 g of glucose ($C_6H_{12}O_6$) were added and completely mixed. The solution was put into a high temperature oven and heated to 300° C. for 30 min. Small and loose powder was generated after temperature dropped. The powder was brought back to the furnace and heated to 600° C. for 6 h with argon gas at flow rate of 800 ml/min. Ceramic powder of $LiMnPO_4$ in complete crystal phase was obtained as temperature dropped, and the X-ray powder diffraction (XRD) is shown in FIG. 2.

Example 5

Examples 5-7 are embodiments for synthesis method of $Li_xM_yM'_{1-y}PO_4$, wherein $0.1 \leq x \leq 1$, $0 \leq y \leq 1$. Example 5 is the embodiment for $LiMn_{0.6}Fe_{0.4}PO_4$ synthesis.

2.304 g of ferrous nitrate ($Fe(NO_3)_2$), 4.819 g of manganese nitrate ($Mn(NO_3)_2.4H_2O$) and 2.206 g of lithium nitrate ($LiNO_3$) was dissolved in deionized water respectively, followed by mixing these solution and adding 3.689 g of phosphoric acid ($H_3PO_4$) and 5 g of nitric acid ($HNO_3$). After mixed thoroughly, 6.16 g of Glycine ($C_6H_8O_7.H_2O$) and 5 g of glucose ($C_6H_{12}O_6$) were added and completely mixed. The solution was put into a high temperature oven and heated to 300° C. for 30 min. Small and loose powder was generated after temperature dropped. The powder was brought back to the furnace and heated to 600° C. for 6 h under a mixed gas, with hydrogen gas at flow rate of 50 ml/min and argon gas at flow rate of 1 l/min. Ceramic powder of $LiMn_{0.6}Fe_{0.4}PO_4$ in complete crystal phase was obtained as temperature dropped.

Example 6

Example 6 is an embodiment for synthesis method of $LiMn_{0.8}Fe_{0.2}PO_4$.

The basic steps of example 6 were the same as in example 5 except the amounts of ferrous nitrate and manganese nitrate were changed into 1.152 g and 6.426 g respectively. Ceramic powder of $LiMn_{0.8}Fe_{0.2}PO_4$ in complete crystal phase was obtained as temperature dropped.

Example 7

Example 7 is an embodiment for synthesis method of $LiFe_{0.9}Mg_{0.1}PO_4$.

5.184 g of ferrous nitrate ($Fe(NO_3)_2$), 0.821 g of magnesium nitrate ($Mg(NO_3)_2.6H_2O$) and 2.206 g of lithium nitrate ($LiNO_3$) was dissolved in deionized water respectively, followed by mixing these solution and adding 3.689 g of phosphoric acid ($H_3PO_4$) and 5 g of nitric acid ($HNO_3$). After mixed thoroughly, 6.16 g of Glycine ($C_6H_8O_7 \cdot H_2O$) and 5 g of glucose ($C_6H_{12}O_6$) were added and completely mixed. The solution was put into a high temperature oven and heated to 300° C. for 30 min. Small and loose powder was generated after temperature dropped. The powder was brought back to the furnace and heated to 600° C. for 6 h under a mixed gas, with hydrogen gas at flow rate of 50 ml/min and argon gas at flow rate of 1 l/min. Ceramic powder of $LiFe_{0.9}Mg_{0.1}PO_4$ in complete crystal phase was obtained as temperature dropped.

In summary, in comparison to the conventional techniques, the present invention disclosed that nano-scale products can be obtained using a self-propagation combustion synthesis with lower cost reactants and lower reacting temperature in a very short time. Operation temperature is lower than the prior techniques, and the duration in high temperature is also shortened obviously for the heat treatment. Not only the expensive cost is lowered, but the production rate is enhanced in the present invention.

What is claimed is:

1. A method for the preparation of a lithium phosphate compound with an olivine crystal structure, comprising:
   (a) providing an aqueous solution containing at least one M metal ion, a lithium ion, a phosphate ion and a nitric acid;
   (b) adding a soluble reductant and a carbon source to the aqueous solution in Step (a);
   (c) dehydrating the aqueous solution followed by a self-propagating combustion at 150-300° C.; and
   (d) heating a combusted product obtained from the self-propagating combustion to promote crystallization of the combusted product, in order to obtain a final product with a complete crystal phase,
   wherein an amount of the nitric acid added in Step (a) is within 80-120% by weight of the final product; and the soluble reductant in Step (b) is selected from the group consisting of urea ($CO(NH_2)_2$), citric acid ($C_6H_8O_7$), glycine ($C_2H_5NO_2$), alanine ($C_3H_7NO_2$), carbohydrazide ($CH_6N_4O$), diformyl hydrazide ($C_2H_4N_2O_2$), oxalyl dihydrazide ($C_2H_6N_4O_2$) and combinations thereof.

2. The method as claimed in claim 1, wherein the aqueous solution in Step (a) further comprises an M' metal ion.

3. The method as claimed in claim 2, wherein the final product in Step (d) is $Li_xM_yM'_{1-y}PO_4$ with an olivine crystal structure, wherein $0.1 \leq x \leq 1$, $0 \leq y \leq 1$.

4. The method as claimed in claim 2, wherein the M' metal ion is selected from the group consisting of magnesium (Mg), calcium (Ca), aluminum (Al), zinc (Zn), manganese (Mn), copper (Cu), zirconium, nickel (Ni), and rare earth element cerium (Ce) and samarium (Sm).

5. The method as claimed in claim 4, wherein the source of the M' metal ion is selected from the group consisting of a nitrate compound, a sulfate compound, an oxalate compound, a phosphate compound, an acetate compound, and a carbonate compound.

6. The method as claimed in claim 5, wherein the source of the M' metal ion is obtained by dissolving a M' metal or a M' metal compound in strong acid solution selected from the group consisting of hydrochloric acid (HCl), nitric acid ($HNO_3$), phosphoric acid ($H_3PO_4$), sulfuric acid ($H_2SO_4$), hydrofluoric acid (HF) and combinations thereof.

7. The method as claimed in claim 4, wherein the source of the M' metal ion is obtained by dissolving a M' metal or a M' metal compound in strong acid solution selected from the group consisting of hydrochloric acid (HCl), nitric acid ($HNO_3$), phosphoric acid ($H_3PO_4$), sulfuric acid ($H_2SO_4$), hydrofluoric acid (HF) and combinations thereof.

8. The method as claimed in claim 1, wherein the M metal ion in Step (a) is selected from the group consisting of iron (Fe), titanium (Ti), vanadium (V), manganese (Mn), chromium (Cr), cobalt (Co), nickel (Ni), copper (Cu), and zinc (Zn).

9. The method as claimed in claim 8, wherein a source of the M metal ion is selected from the group consisting of a nitrate compound, a sulfate compound, an oxalate compound, a phosphate compound, an acetate compound, and a carbonate compound.

10. The method as claimed in claim 9, wherein the source of the M metal ion is obtained by dissolving a M metal or a M metal compound in strong acid solution selected from the group consisting of hydrochloric acid (HCl), nitric acid ($HNO_3$), phosphoric acid ($H_3PO_4$), sulfuric acid ($H_2SO_4$), hydrofluoric acid (HF) and combinations thereof.

11. The method as claimed in claim 8, wherein the source of the M metal ion is obtained by dissolving a M metal or a M metal compound in strong acid solution selected from the group consisting of hydrochloric acid (HCl), nitric acid ($HNO_3$), phosphoric acid ($H_3PO_4$), sulfuric acid ($H_2SO_4$), hydrofluoric acid (HF) and combinations thereof.

12. The method as claimed in claim 1, wherein the source of the lithium ion in Step (a) is a soluble compound selected from the group consisting of lithium nitrate ($LiNO_3$), lithium oxalate ($Li_2C_2O_4$), lithium phosphate ($Li_3PO_4$), lithium acetate ($CH_3COOLi$), lithium carbonate ($Li_2CO_3$), lithium chloride (LiCl), lithium bromide (LiBr), lithium hydroxide (LiOH), and lithium dihydrogen phosphate ($LiH_2PO_4$).

13. The method as claimed in claim 12, wherein the source of the lithium ion is obtained by dissolving a lithium metal or a lithium compound in strong acid solution selected from the group consisting of hydrochloric acid (HCl), nitric acid ($HNO_3$), phosphoric acid ($H_3PO_4$), sulfuric acid ($H_2SO_4$), hydrofluoric acid (HF) and combinations thereof.

14. The method as claimed in claim 1, wherein the phosphate ion in Step (a) is phosphoric acid ($H_3PO_4$) or aqueous phosphoric compound.

15. The method as claimed in claim 14, wherein the aqueous phosphoric compound is selected from the group consisting of ammonium dihydrogen phosphate ($NH_4H_2PO_4$), ammonium hydrogen phosphate (($NH_4)_2HPO_4$), triammonium phosphate (($NH_4)_3PO_4$), phosphorous pentoxide ($P_2O_5$), lithium phosphate ($Li_3PO_4$), lithium dihydrogen phosphate ($LiH_2PO_4$), lithium hydrogen phosphate ($Li_2HPO_4$) and combinations thereof.

16. The method as claimed in claim 1, wherein the amount of the soluble reductant added in Step (b) is between 80% and 150% of the final product.

17. The method as claimed in claim 1, wherein the carbon source in Step (b) is selected from the group consisting of glucose ($C_6H_{12}O_6$), sucrose ($C_{12}H_{22}O_{11}$), starch (($C_6H_{10}O_5)_n$), oligo-sugar (($CH_2O)_n$), poly olig-sugar (($CH_2O)_n$), fructose ($C_6H_{12}O_6$), resin and combinations thereof.

18. The method as claimed in claim 1, wherein the amount of the carbon source added in Step (b) is between 80% and 200% of the final product.

19. The method as claimed in claim 1, wherein a heat-treatment temperature of the combusted product in step (d) is between 500-800° C.

20. The method as claimed in claim 1, wherein a heat-treatment time in step (d) is between 1-24 h.

21. The method as claimed in claim 1, wherein an inert gas is applied during the heat treatment in step (d) to prevent the oxidation of the M metal ion.

22. The method as claimed in claim 21, wherein the inert gas is selected from the group consisting of helium (He), argon (Ar), nitrogen ($N_2$), carbon dioxide ($CO_2$) and combinations thereof.

23. The method as claimed in claim 21, wherein the inert gas is further mixed with a reducing gas to reduce the M metal ion to low oxidative state when the M metal ion is in high oxidative state.

24. The method as claimed in claim 23, wherein the reducing gas is selected from the group consisting of hydrogen gas ($H_2$), ammonium gas ($NH_3$), carbon monoxide (CO) and combinations thereof.

* * * * *